April 30, 1957  G. F. HARFORD  2,790,626

CATTLE GUARDS

Filed July 1, 1955

GEORGE F. HARFORD
INVENTOR.

BY *Loyal H. McCarthy*

ATTORNEY.

United States Patent Office 2,790,626
Patented Apr. 30, 1957

2,790,626
CATTLE GUARDS

George F. Harford, Redmond, Oreg.

Application July 1, 1955, Serial No. 519,492

5 Claims. (Cl. 256—17)

My invention relates to improvements in cattle guards for use in providing means for preventing cattle or livestock from passing through a fence or enclosure opening.

Among the objects of my invention is to eliminate the necessity of maintaining a gate in a fence enclosing livestock and to provide free passage of vehicles into and from the stock enclosure without the necessity of stopping to open or close a gate and at the same time to prevent livestock from escaping.

Another object of my invention is to provide an inexpensive and efficient cattle guard which may be conveniently transported to the place of installation with its parts unassembled and thereafter quickly assembled and installed at the desired location.

Still another object of my invention is to furnish a cattle guard of the character described which will provide a practical, efficient deterrent against livestock passing over the same and at the same time present a smooth road bed over which vehicles may pass.

Other objects and advantages will be apparent from the specification and drawings.

Referring to the drawings.

Figure 1:
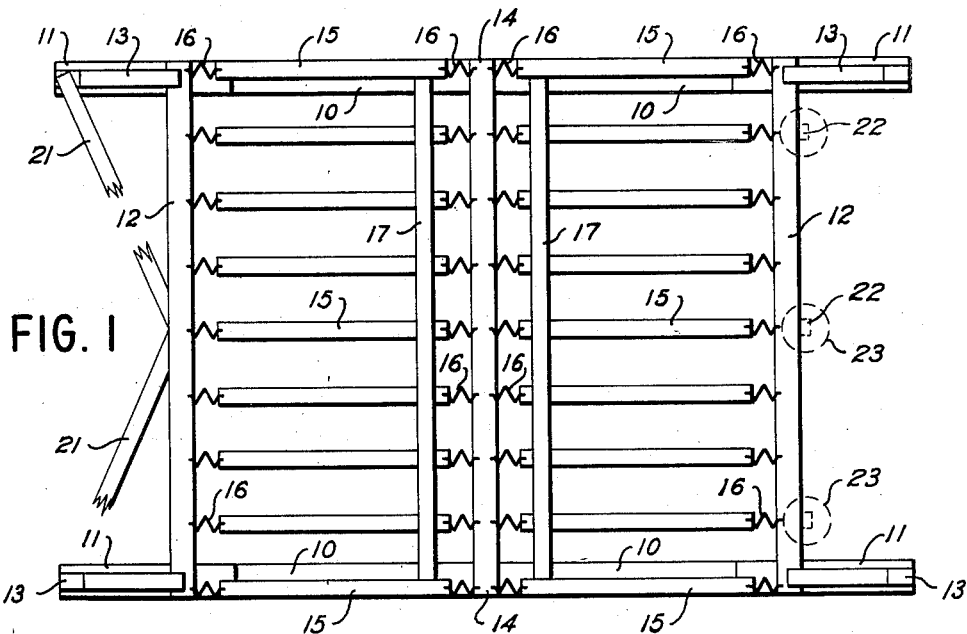
Figure 1 is a plan view of my improved cattle guard.

Referring further to the drawings:

A lateral frame member 10 is provided at each end of my cattle guard. Superimposed upon the top of said lateral frame member 10 and extending beyond the ends thereof are lateral frame extension elements 11. The said member 10 and elements 11 are preferably fabricated from hollow, circular stock, such as large metal pipe. Longitudinal frame members 12 are set into and secured to the lateral frame extension elements 11 at a point near the ends of the lateral frame member 10, connecting said lateral frame members together and forming a generally rectangular figure. There are two longitudinal frame members 12, each connecting complementary ends of the lateral frame elements near the ends of the lateral frame members 10. The frame elements 12 thus form the sides of the device and are preferably made from angular iron stock. One flange of the frame elements 12 is positioned substantially parallel to the surface of the ground, the other flange being substantially vertical to the surface of the ground and set into notches in the lateral frame extension elements 11. A brace 13 is secured to the longitudinal frame elements 12 at each end thereof by means of a bolt 20 through said brace 13, longitudinal frame element 12, the lateral frame extension element 11 and the lateral frame member 10. The other end of the brace 13 is secured to the outer end of the lateral frame extension element 11 by a bolt which also secures an angular brace 21 to said lateral frame extension element 11. The inner ends of the angular braces 21 are bolted, the bolt not being shown in the drawings, to the sides of their respective longitudinal frame elements 12 near the mid-points thereof. The bolting of the brace members 13 and 21 to the lateral and longitudinal frame elements of my device forms a strong and rigid unit. A central longitudinal frame member 14, formed preferably from T-shaped stock, is secured at each of its ends to the mid portion of the lateral frame members 10 by means of being bolted to a flange 14a provided at the mid-point of each of the lateral frame members 10.

Figure 2:
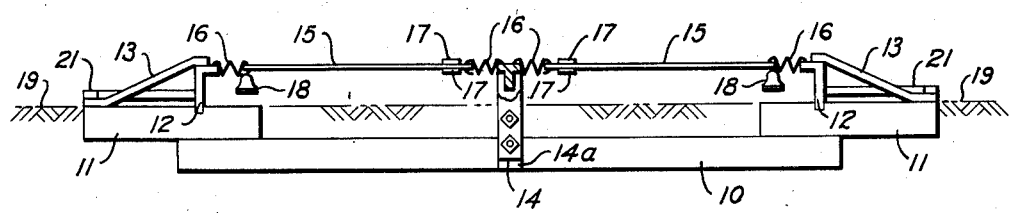
Figure 2 is an end elevational view of my improved cattle guard, showing its relation to the approximate ground line when installed.
Figure 3:
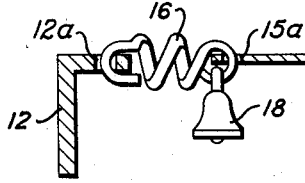
Figure 3 is a typical sectional detail view, showing the manner of securing the lateral strips to the longitudinal frame elements.
Figure 4:
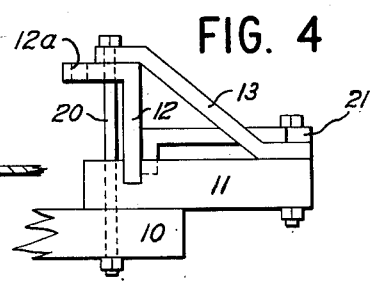
Figure 4 is a detailed view of one end of the lateral frame member, showing the manner in which the longitudinal frame members are set into, secured and braced to the lateral frame members.

A series of holes 12a are positioned at equally spaced intervals along the inner edge of the horizontal flange of each longitudinal frame member 12 and both edges of the horizontal flange of the central longitudinal frame member 14, so that each hole of a flange is in lateral alignment with the complementary holes of the flanges of the other longitudinal frame member 12 and the central longitudinal frame member 14. Lateral strips 15 are suspended between the longitudinal frame members 12 and the central longitudinal frame member 14 by means of springs 16 being hooked through the complementary holes 12a of the series of holes along the edges of the longitudinal frame members 12 and the central frame member 14; the other end of the springs 16 being hooked into holes 15a in the adjacent ends of the lateral strips 15. Strips 17 are installed longitudinally of the device, being hooked at either end beneath the lateral strips 15 and positioned parallel and close to the central longitudinal frame element 14. A small bell 18 is secured to the inner end of the springs 16 substantially beneath the hole 15a next to the longitudinal frame members 12 on the first two lateral strips 15 at each end of the cattle guard. As shown in Figure 2 of the drawings, the approximate ground line 19 is substantially at the upper edge of the lateral frame extension elements 11 when the cattle guard is installed for use at any fence opening other than one provided with a hard surface such as concrete, asphalt, macadam, etc.

Figure 5:
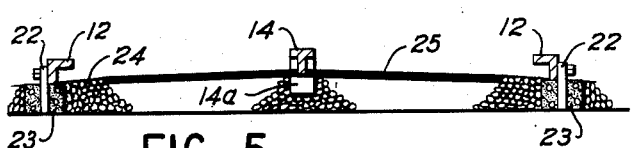
Figure 5 is a sectional view of one of my cattle guards on a reduced scale with parts omitted, showing the manner in which it is installed in a hard surfaced road.

When installed on highway or other openings through fence lines which are provided with hard surfaces my cattle guard is modified and installed substantially as shown in Figure 5 of the drawings. In such an installation the lateral frame members 10, the lateral frame extension elements 11, the brace members 13 and the angular brace members 21 are eliminated, and in lieu thereof a vertical anchor 22 is imbedded in concrete 23 along the shoulder 24 of the hard surface road or edges of the hard surface opening through a fence line to which anchors 22 and the longitudinal frame members 12 are bolted. At least three anchors 22 imbedded in concrete 23 are provided for each longitudinal frame member 12. The central frame member 14 is then bolted to the frame 14a which is anchored into the hard surface of the highway or the opening through a fence line. The other elements of installation of the cattle guard are the same as described herein for a dirt or gravel road or in a field.

My improved cattle guard is installed with respect to a fence line, so that it will extend approximately equal distances on each side of said fence. Railings not shown in the drawings approximately the same height as that of the fence are provided along the longitudinal sides of my guard to keep animals from stepping around the end post of the fence without passing over the guard itself. The lateral strips 15, being substantially above the approximate ground line 19 or hard surface 25 and being spaced substantially apart, present an appearance of insecure and unsafe footing to animals which might attempt passing through the opening of fences in which my cattle guard is installed.

Vehicles, however, may pass through the opening without difficulty and the necessity of stopping to open gates or of materially reducing speed while passing through an opening protected with the cattle guard. The springs 16 give as vehicles pass over and upon the lateral strips 15, allowing the wheels of the vehicle to roll freely upon the surface of the ground or highway itself. The bells 18 positioned at the outer ends of the first two lateral strips 15, jingle whenever the strips are moved and thereby provide a warning that vehicles are passing through the opening and act as a further deterrent to the passage of livestock.

Having thus described my invention what I claim is:

1. In a cattle guard: a rectangular frame portion having lateral end portions, lateral frame extensions provided with notches and longitudinal sides detachably attached to and set into the notches on said lateral extensions detachably attached on top of said lateral end portions adapted to be anchored into the ground; a longitudinal frame element medial to the longitudinal sides and detachably attached to the midpoint of each lateral end portion; a plurality of depressible lateral strips suspended from an attached to one of the longitudinal sides and the medial longitudinal frame member by means of a tension spring at each end of each lateral strip; alarm bells connecting with the tension spring at the outer end of each lateral strip near the ends of the cattle guard, adapted to be activated by the depressing movement of said lateral strips; and longitudinal strips positioned parallel with and near to the central longitudinal frame member.

2. In a cattle guard: parallel longitudinal frame members in spaced relation to each other detachably attached to anchors set into the ground along the sides of a hard-surfaced opening; another longitudinal frame member parallel to and medial of said frame members; a plurality of depressible lateral strips suspended from and attached to one of the parallel longitudinal frame members and the medial longitudinal frame member; tension springs at each end of and suspending said lateral strips; alarm bells connecting with the tension spring at the outer end of each lateral strip near the ends of the cattle guard, adapted to be activated by the depressing movement of said lateral strips; and longitudinal strips positioned parallel with and near to the central longitudinal frame member.

3. In a cattle guard for hard surfaced areas: two longitudinal frame members, forming the sides of the cattle guard and having flanges with a series of holes spaced therealong; spaced lateral strips suspended by tension springs connecting with said frame members; anchors secured to each of said longitudinal frame members, rigidly holding said longitudinal frame members parallel to a hard surface; a central longitudinal frame member; flanges secured to the ends of said central longitudinal frame member and buried in the hard surface; a T flange on said central longitudinal frame member, having a series of holes in each edge spaced in lateral alignment with the holes in said longitudinal frame members forming the sides of the cattle guard; lateral strips in horizontal alignment with said laterally aligned holes positioned in the longitudinal frame members and the central longitudinal frame member; tension springs at each end of said lateral strips, suspending said strips between the longitudinal frame members and the central longitudinal frame member; longitudinal strips positioned parallel with and near to the central longitudinal frame member, the ends of said strips being inserted under the inner ends of the extreme lateral strips; and alarm bells secured at the outer ends of the lateral strips near each end of the cattle guard.

4. In a cattle guard having spaced lateral strips suspended by tensioning springs: two lateral frame members, one at each end of the cattle guard; a lateral frame extension element secured to the upper surface of each end of said lateral frame members; longitudinal frame members, having flanges and having a series of holes spaced along said flanges, set into and secured to said lateral frame extension elements near the ends of the lateral frame members, forming the sides of the cattle guard; a central longitudinal frame member medially of the longitudinal frame members forming the sides of the cattle guard, having flanges and having a series of holes in each flange spaced in lateral alignment with the holes in said longitudinal frame members; a flange secured medially of each lateral frame member complementary to and securing the said central longitudinal frame member in place; braces from the outer ends of said lateral frame extension members to the top of the adjacent ends of the adjacent longitudinal frame members forming the sides of the cattle guard, said braces positioned in vertical planar alignment with the lateral frame extension members to which they are secured, angular braces, also secured to the outer ends of each lateral frame extension member, angling toward and secured substantially medially of the longitudinal frame member forming the adjacent side of the cattle guard; a bolt securing the inner ends of said braces, the longitudinal frame member, the lateral frame extension element and the lateral frame member in rigid juxtaposition; lateral strips in horizontal alignment with the complementary holes positioned in the longitudinal frame members and the central longitudinal frame member; tension springs at each end of said lateral strips, suspending said strips between the longitudinal frame members and the central longitudinal frame member; longitudinal strips positioned parallel with and near to the central longitudinal frame member, the ends of said strips being inserted under the innner ends of the extreme lateral strips; and alarm bells secured at the outer ends of the lateral strips near each end of the cattle guard.

5. In a cattle guard having spaced lateral strips suspended by tensioning springs: two lateral frame members, one at each end of the cattle guard; a lateral frame extension element secured to the upper surface of each end of said lateral frame members; longitudinal frame members, having flanges and having a series of holes spaced along said flanges, set into and secured to said lateral frame extension elements near the ends of the lateral frame members, forming the sides of the cattle guard; a central longitudinal frame member, medially of the longitudinal frame members forming the sides of the cattle guard, having flanges and having a series of holes in each flange spaced in lateral alignment with the holes in said longitudinal frame members; a flange secured medially of each lateral frame member complementary to and securing the said central longitudinal frame member in place; a plurality of detachable braces from the outer ends of each of said lateral frame extension members to its adjacent longitudinal frame member forming one side of the cattle guard; detachable means securing the inner ends of one of the plurality of said braces, the longitudinal frame member, the lateral frame extension element and the lateral frame member in rigid juxtaposition; lateral strips in horizontal alignment with the complementary holes positioned in the longitudinal frame members and the central longitudinal frame member; tension springs at each end of said lateral strips, suspending said strips between the longitudinal frame members and the central longitudinal frame member; longitudinal strips positioned parallel with and near to the central longitudinal frame member, the ends of said strips being inserted under the inner ends of the extreme lateral strips; and alarm bells secured at the outer ends of the lateral strips near each end of the cattle guard.

References Cited in the file of this patent

UNITED STATES PATENTS

| | | |
|---|---|---|
| 2,576,188 | McPherson | Nov. 27, 1951 |
| 2,710,173 | Manuel et al. | June 7, 1955 |